(12) United States Patent
Suresh et al.

(10) Patent No.: US 11,585,158 B2
(45) Date of Patent: Feb. 21, 2023

(54) ISOLATED LUBRICATION SYSTEM FOR DRILL BITS

(71) Applicant: Caterpillar Inc., Peoria, IL (US)

(72) Inventors: Swetha Suresh, Chennai (IN); Brian Stuart Skauge, Peoria, IL (US); David Hakes, Princeville, IL (US); Chetan Vilas Dahiwal, Chennai (IN); Timothy A Thorson, Morton, IL (US); Gary Clifford Yerby, Morton, IL (US); Geoffrey Damien Chovanec, Dunlap, IL (US); Thomas John Yaniak, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 89 days.

(21) Appl. No.: 16/879,855

(22) Filed: May 21, 2020

(65) Prior Publication Data
US 2021/0363830 A1 Nov. 25, 2021

(51) Int. Cl.
*E21B 10/24* (2006.01)
*E21B 10/25* (2006.01)
*F16C 33/66* (2006.01)
*E21B 10/14* (2006.01)

(52) U.S. Cl.
CPC .............. *E21B 10/24* (2013.01); *E21B 10/14* (2013.01); *E21B 10/25* (2013.01); *F16C 33/66* (2013.01); *F16C 2352/00* (2013.01)

(58) Field of Classification Search
CPC ......... E21B 10/22; E21B 10/24; E21B 10/246
See application file for complete search history.

(56) References Cited

U.S. PATENT DOCUMENTS

| | | | | |
|---|---|---|---|---|
| 3,244,459 A | * | 4/1966 | Ortloffjohne | E21B 10/246 384/93 |
| 3,251,634 A | * | 5/1966 | Dareing | F16C 32/0644 384/93 |
| 3,985,366 A | * | 10/1976 | Plouzek | F16J 15/344 277/382 |
| 4,037,673 A | | 7/1977 | Justman | |
| 4,055,225 A | * | 10/1977 | Millsapps | E21B 10/24 175/228 |
| 4,184,554 A | * | 1/1980 | Levefelt | E21B 21/10 175/317 |
| 4,199,856 A | * | 4/1980 | Farrow | E21B 10/24 141/1 |
| 4,249,622 A | | 2/1981 | Dysart | |

(Continued)

*Primary Examiner* — Blake Michener

(57) ABSTRACT

An isolated lubrication system for a drill bit is disclosed. The system comprises a body having a cutting arm with a journal and a rotary cutter mounted on the journal. The system also comprises a reservoir in a body to contain a fluid lubricant that isolated from communication outside the body. The system also comprises multiple conduits in communication with the reservoir and with respect to each other. The multiple conduits facilitate lubrication between the journal and the rotary cutter, including the bearings, by means of a gravitational force and/or a centrifugal force acting of the fluid lubricant. Further, the system comprises a sealing system. The sealing system includes a sealing cap provided to the reservoir, a seal provided between the journal and the rotary cutter, and a stepped passageway provided in a clearance between the rotary cutter and a cutting arm of the body.

19 Claims, 11 Drawing Sheets

(56) References Cited

U.S. PATENT DOCUMENTS

| | | |
|---|---|---|
| 4,279,450 A | 7/1981 | Morris |
| 4,386,668 A | 6/1983 | Parish |
| 4,399,878 A | 8/1983 | Karlsson et al. |
| 4,428,442 A | 1/1984 | Steinke |
| 4,446,933 A | 5/1984 | Bodine |
| 4,666,001 A | 5/1987 | Burr |
| 4,942,930 A * | 7/1990 | Millsapps, Jr. ......... E21B 10/24 141/114 |
| 4,981,182 A * | 1/1991 | Dysart ................. E21B 10/23 175/227 |
| 5,027,911 A | 7/1991 | Dysart |
| 5,437,509 A | 8/1995 | Templeton |
| 5,441,120 A | 8/1995 | Dysart |
| 6,033,117 A | 3/2000 | Cariveau et al. |
| 6,179,296 B1 | 1/2001 | Cawthorne et al. |
| 6,431,293 B1 | 8/2002 | Portwood et al. |
| 6,536,542 B1 | 3/2003 | Fang et al. |
| 6,619,412 B2 * | 9/2003 | Slaughter, Jr. ........ E21B 10/003 384/93 |
| 6,679,342 B2 | 1/2004 | Portwood et al. |
| 8,746,374 B2 | 6/2014 | Harrington et al. |
| 10,113,366 B2 | 10/2018 | Duckworth |
| 2003/0116357 A1 | 6/2003 | Peterson et al. |
| 2008/0105467 A1 * | 5/2008 | Yong ..................... E21B 10/24 175/228 |
| 2011/0048810 A1 | 3/2011 | Lin et al. |
| 2016/0040482 A1 | 11/2016 | Loikkanen et al. |

\* cited by examiner

ISOLATED LUBRICATION SYSTEM FOR DRILL BITS

TECHNICAL FIELD

The present disclosure relates to drill bits applicable in drilling operations. More particularly, the present disclosure relates to an isolated lubrication system for drill bits that facilitates uniform lubrication of different bearing elements in drill bits and also prevents lubricant contamination in drill bits.

BACKGROUND

Conventional roller cone drill bits include a body having two or more cutting arms. Each cutting arm defines an angular journal upon which a rotating disk or a roller cone is mounted. A roller cone drill bit, such as a "Tricone" drill bit for example, includes the body having three cutting arms defining three angular journals and three roller cones mounted on the three angular journals respectively. The roller cone may have multiple protrusions or teeth to cut through different rock formations. Further, the roller cone may be mounted on the angular journal with one or more bearing elements, such as, for example, ball bearings and rolling element bearings. The bearing elements facilitate rotation of the roller cone around an axis of the roller cone and the angular journal. During operation, an application of feed force and rotation to the body further enables the rotation of the roller cone by means of the ball bearings and the roller element bearings. The rotation of the teeth along with the rotation of the roller cone further enables the cutting of rocks.

Typically, the bearing elements in the roller cone drill bits are lubricated by means of a lubricant such as grease. However, grease as a lubricant may have limited flowability and may not lubricate different regions, such as crevices, edges, corners, and grooves, in and/or around different geometries of the bearing elements in an effective manner. As a result, a lifespan and performance of the roller cone drill bit may be affected over prolonged usage of the roller cone drill bit. Further, complex lubricant reservoirs with diaphragms and lubricant delivery systems may be needed in order to supply the grease to the bearing elements of the roller cone drill bits. In some instances, equalization of a pressure outside the roller cone drill bit and a pressure inside a lubricant reservoir of the roller cone drill bit may also be needed in order to squeeze the grease from the lubricant reservoir to the different regions in and/or around the bearing elements. The pressure equalization may further require additional parts and/or features in the roller cone drill bit to facilitate movement of the grease as desired.

In addition, the grease may also get contaminated with debris resulting from the cutting of the rocks. During operation, debris may accumulate around a lubricant seal provided between the roller cone and the angular journal of the roller cone drill bit. Continuous accumulation of the debris during operation results in wear and tear of the lubricant seal. The wear and tear may further result in seepage of the debris through annular spaces around the lubricant seal, and thereby result in the contamination of the grease lubricant. The contamination of grease further affects the lubrication of the bearing elements and hence, reduces the lifespan and performance of the roller cone drill bits.

U.S. Pat. No. 4,428,442 relates to a rock bit lubrication system having a pressurized air chamber and a central container of a lubricating liquid. Further, the rock bit lubrication system includes conduits that extend from an interior of the central container to an opening that allows air under pressure from the pressurized air chamber to entrain the lubricating liquid in measured amounts. The air under pressure also directs the lubricating liquid into openings leading to bearings formed between the roller cone and the journal. As is apparent, the rock bit lubrication system requires a complex arrangement of the central container, the pressurized air chamber, and the conduits to ensure sufficient circulation of the grease around the bearings. Further, debris from the rock cuttings may also seep through openings around the roller cone and contaminate the grease.

SUMMARY OF THE INVENTION

In an aspect of the disclosure, a rotary drill bit comprising a body having a cutting arm with a journal extending therefrom is disclosed. A rotary cutter may be mounted on the journal by means of multiple bearings such that a clearance is defined between the rotary cutter and a base surface of the cutting arm from which the journal extends. The rotary drill bit also comprises an isolated lubrication system. The isolated lubrication system includes a reservoir in the body to contain a fluid lubricant that is isolated from communication outside the body. Further, the isolated lubrication system includes a plurality of conduits in the body having direct or indirect communication with the reservoir and with respect to each other. The conduits may facilitate lubrication between the journal and the rotary cutter, including the bearings, by means of at least one of a gravitational force and a centrifugal force acting on the fluid lubricant. The isolated lubrication system also includes a sealing system. The sealing system may include a sealing cap provided to the reservoir and a seal provided between the journal and the rotary cutter in the clearance. The sealing system may also include a stepped passageway extending from the seal to an opening provided between the cutting arm and the rotary cutter in the clearance.

In another aspect of the disclosure, an isolated lubrication system for drill bits is disclosed. The isolated lubrication system comprises a body having a cutting arm with a journal extending therefrom. A rotary cutter is mounted on the journal by means of multiple bearings such that a clearance is defined between the rotary cutter and a base surface of the cutting arm from which the journal extends. The body defines a reservoir to contain a fluid lubricant and isolate the fluid lubricant from communication outside the body. The body also defines a first conduit that is in communication with the reservoir such that the fluid lubricant from the reservoir occupies the first conduit by means of a gravitational force. Further, the body defines a second conduit that is in communication with the first conduit such that the fluid lubricant from the first conduit occupies the second conduit and lubricates at least one bearing of the plurality of bearings. In addition, the body defines a third conduit that is in communication with the second conduit and extends to an outlet provided in the journal. The isolated lubrication system also includes a sealing system. The sealing system may include a sealing cap provided to the reservoir. The sealing system may also include a pin inserted in the second conduit to retain the at least one bearing in position and the fluid lubricant in the second conduit. Further, the sealing system may include a reservoir seal provided between the journal and the rotary cutter in the clearance. In addition, the sealing system may include a stepped passageway extending from the seal to an opening provided between the cutting arm and the rotary cutter in the clearance.

In yet another aspect of the invention, a drilling machine comprising a power source, a feed unit in communication with the power source, and a drill bit connected to the feed unit, is disclosed. The drill bit defines a body having a cutting arm with a journal extending therefrom. A rotary cutter may be mounted on the journal by means multiple bearings such that a clearance is defined between the rotary cutter and a base surface of the cutting arm from which the journal extends. The drill bit also defines an isolated lubrication system. The isolated lubrication system includes a reservoir in the body to contain a fluid lubricant that is isolated from communication outside the body. Further, the isolated lubrication system includes a plurality of conduits in the body having direct or indirect communication with the reservoir and with respect to each other. The conduits may facilitate lubrication between the journal and the rotary cutter and to the bearings by means of at least one of a gravitational force and a centrifugal force acting on the fluid lubricant. The isolated lubrication system also includes a sealing system. The sealing system may include a sealing cap provided to the reservoir, a reservoir seal provided between the journal and the rotary cutter in the clearance. The sealing system may also include a stepped passageway extending from the seal to an opening provided between the cutting arm and the rotary cutter in the clearance.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
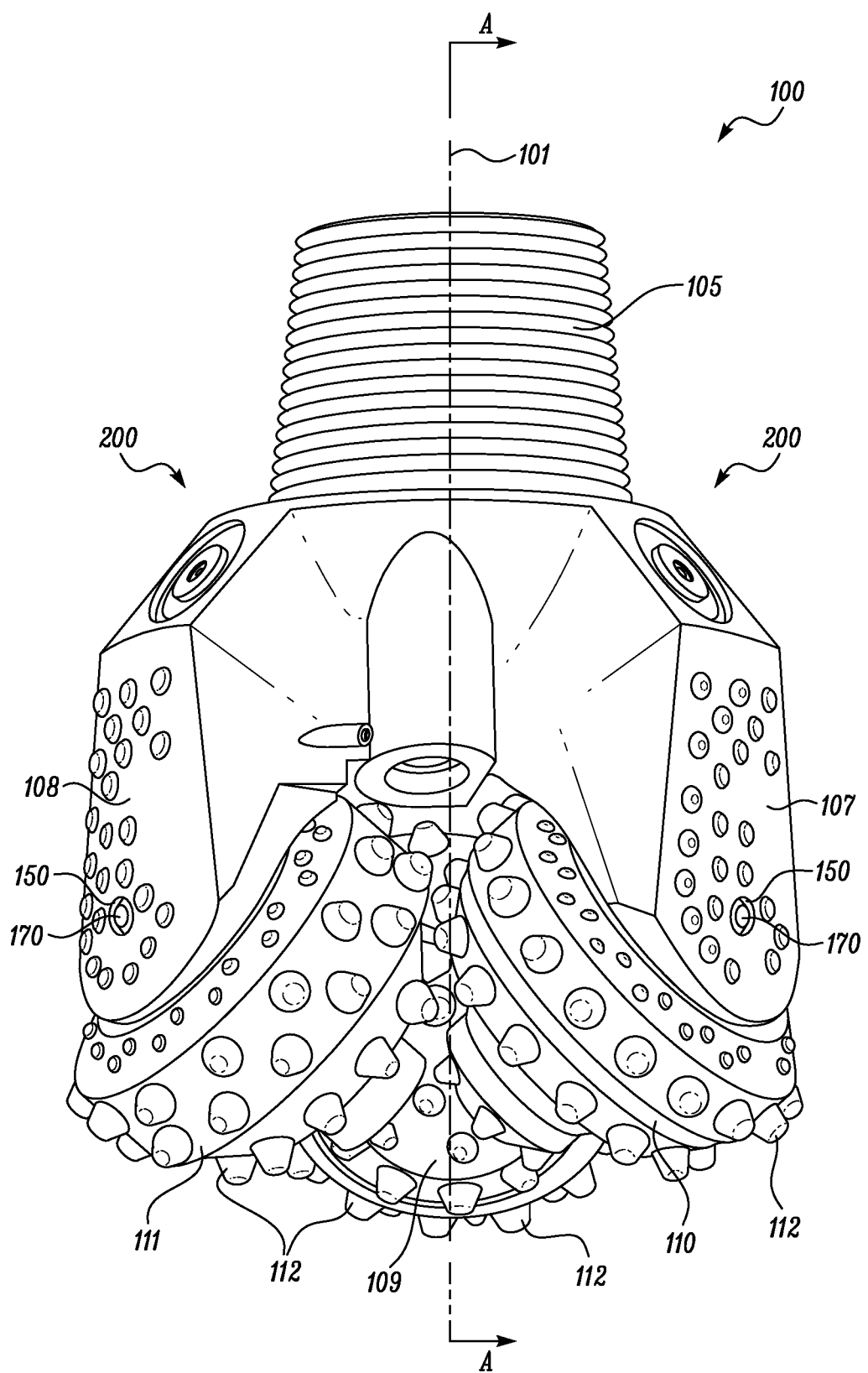
FIG. 1 is an exemplary illustration of a rotary drill bit having three cutting arms and an isolated lubrication system in each cutting arm respectively, in accordance with a first embodiment of the present disclosure.

Referring to FIG. 1, an exemplary illustration of a rotary drill bit 100 is disclosed. An example of the rotary drill bit 100 includes, but is not limited to, a roller-cone bit, such as a tungsten carbide insert (TCI) drill bit or a milled-tooth drill bit. Another example of the rotary drill bit 100 includes, but is not limited to, a fixed-cutter bit, such as a polycrystalline diamond compact (PDC) drill bit, an impregnated drill bit, or a diamond drill bit. For sake of clarity and understanding, the rotary drill bit 100 that corresponds to the roller cone bit will be described herein. Further, the rotary drill bit 100 will herein be referred to as "roller cone bit 100".

The roller cone bit 100 includes a body 105 that is capable of rotating about a central axis 101 of the roller cone bit 100. The body 105 may include a first cutting arm 106 (see FIG. 2), a second cutting arm 107 and a third cutting arm 108. The first cutting arm 106, the second cutting arm 107 and the third cutting arm 108 may be identical and equally spaced at an angle with respect to each other. The body 105 also includes a first rotary cutter 109, a second rotary cutter 110, and a third rotary cutter 111 affixed to the first cutting arm 106, the second cutting arm 107 and the third cutting arm 108 respectively. The first cutting arm 106, the second cutting arm 107 and the third cutting arm 108 are herein referred to as "cutting arms (106, 107, 108)" collectively. The first rotary cutter 109, the second rotary cutter 110, and the third rotary cutter 111 are herein referred to as "rotary cutters (109, 110, 111)" collectively. Further, the rotary cutters (109, 110, 111) may be conical in shape and include inserts 112 such as, for example, tungsten carbide inserts, on respective peripheral surfaces in order to facilitate cutting of rock matter. In some embodiments, the rotary cutters (109, 110, 111) may include milled protruding teeth (not shown) in place of the inserts 112 to facilitate the cutting of the rock matter. The inserts 112 of different lengths and spacing arrangements on the peripheral surfaces of the rotary cutters (109, 110, 111) respectively may be used to cut the rock matter. The rotary cutters (109, 110, 111) may be affixed to the cutting arms (106, 107, 108) respectively such that the rotary cutters (109, 110, 111) with respective inserts 112 may face each other.

In addition, the body 105 also includes an isolated lubrication system 200 corresponding to the cutting arms (106, 107, 108) respectively. The isolated lubrication system 200 may be identical in the cutting arms (106, 107, 108) respectively. Accordingly, for sake of clarity and understanding, the first cutting arm 106 and the isolated lubrication system 200 corresponding to the first cutting arm 106 will be described herein in detail. Detailed explanation with respect to the second cutting arm 107, the third cutting arm 108 and the corresponding isolated lubrication system 200 respectively will be omitted for brevity.

Figure 2:
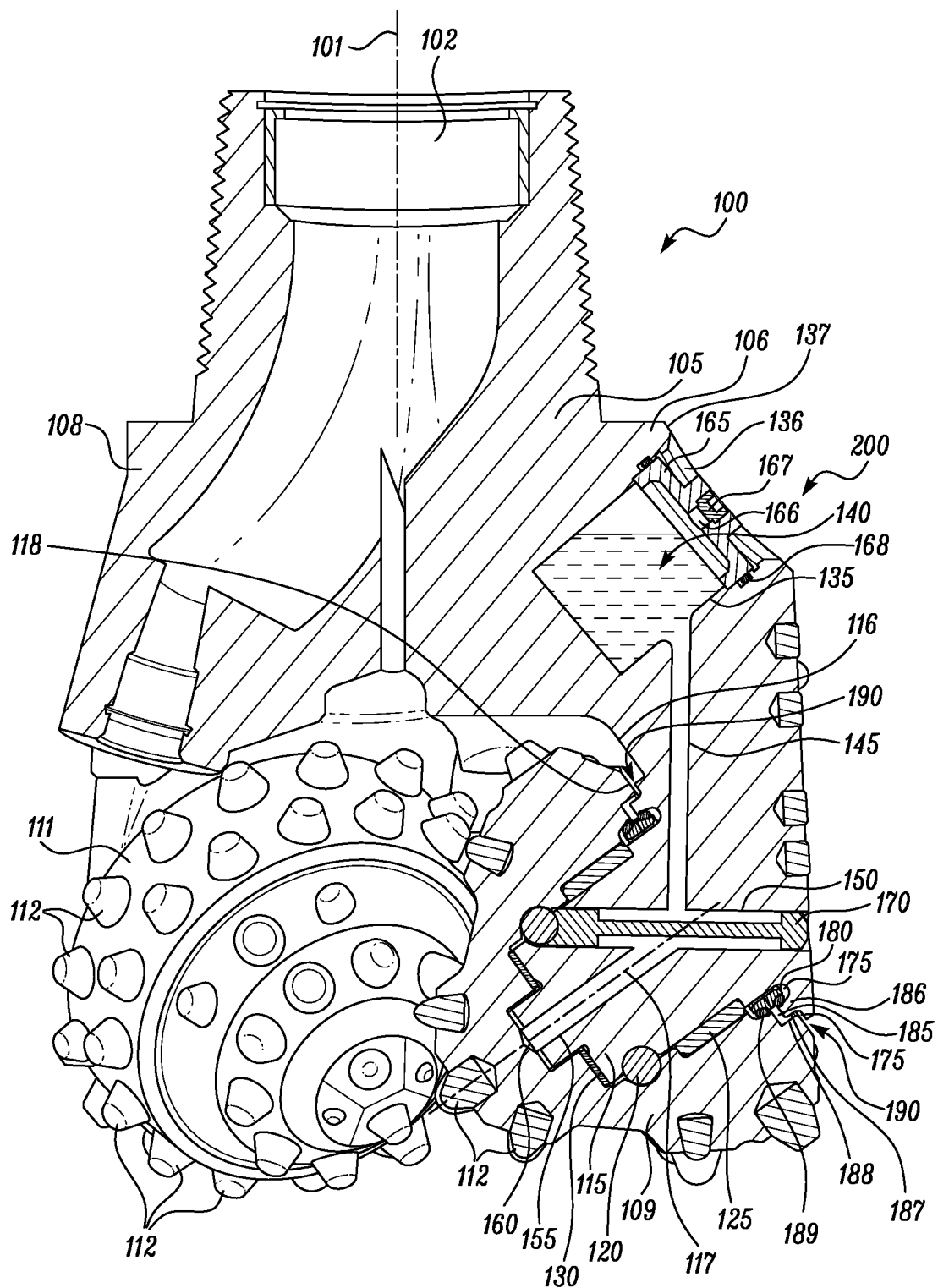
FIG. 2 is a cross-sectional view A-A of the rotary drill bit of FIG. 1 having the isolated lubrication system, in accordance with the first embodiment of the present disclosure.

Referring to FIG. 2, a cross-sectional view A-A of the roller cone bit 100 of FIG. 1 having the isolated system 200 is disclosed. The body 105 of the roller cone bit 100 includes an inlet 102. The first cutting arm 106 includes a journal 115 extending from a base surface 116 of the first cutting arm 106. The first rotary cutter 109 is mounted on the journal 115 by means of bearings (120, 125). An example of the bearings (120, 125) includes, but is not limited to, a ball bearing 120, such as a single-row or deep-groove bearing, a double-row or thrust ball bearing, a double-row self-aligning ball bearing, or a single and double-row angular ball bearing. Another example of the bearings (120, 125) includes, but is not limited to, a rolling element bearing 125, such as a spherical roller bearing, a one-row or a two-row cylindrical bearing, conical tapered roller bearings, or a needle bearing. Additional examples of the bearings (120, 125) include, but are not limited to, plain or sleeve bearings, friction bearings, jewel bearings, fluid bearings, magnetic bearings, flexure bearings, and composite bearings. The first rotary cutter 109 may be mounted on the journal 115 such that the first rotary cutter 109 rotates around an axis 117 of the first rotary cutter 109 and the journal 115 by means of the bearings (120, 125). In some embodiments, additional bearings (not shown) may be provided between the journal 115 and the first rotary cutter 109 to facilitate load sharing along with the bearings (120, 125) and also, to facilitate the rotation of the first rotary cutter 109. A thrust bearing 130 may also be provided between the journal 115 and the first rotary cutter 109 so as to minimize friction between the journal 115 and the first rotary cutter 109 as the first rotary cutter 109 rotates.

The isolated lubrication system 200 of the roller cone bit 100 includes a reservoir 135 in the first cutting arm 106 of the body 105 to contain a fluid lubricant 140 such as, for example, oil. The reservoir 135 may be of different shapes and sizes. For example, the reservoir 135 may be a cylindrical or a rectangular slot in the first cutting arm 106 of the body 105. A volume of the reservoir 135 may also vary depending on the shape and the size of the reservoir 135. The reservoir 135 may have a reservoir opening 136 that extends to a peripheral surface 137 of the first cutting arm 106. Prior to operation of the roller cone bit 100, the isolated lubrication system 200 may need to be primed. The air from the reservoir 135 may need to be removed in order to create a vacuum and introduce the fluid lubricant 140 in the reservoir 135. The vacuum created may facilitate uniform lubrication of the thrust bearing 130 and the bearings (120, 125) when the reservoir 135 is filled with the fluid lubricant 140.

The reservoir 135 may be in direct or indirect communication with multiple conduits (145, 150, 155) such that the conduits (145, 150, 155) facilitate a flow 515 (see FIG. 5) of the fluid lubricant 140 in the isolated lubrication system 200. The conduits (145, 150, 155) may also be in direct or indirect communication with respect to each other in order to facilitate the lubrication between the journal 115 and the first rotary cutter 109, including the bearings (120, 125). The conduits (145, 150, 155) may enable lubrication of multiple spaces, edges, corners, and crevices of different geometric shapes and sizes that may be formed around the bearings (120, 125) and/or between the journal 115 and the first rotary cutter 109.

Figure 4:
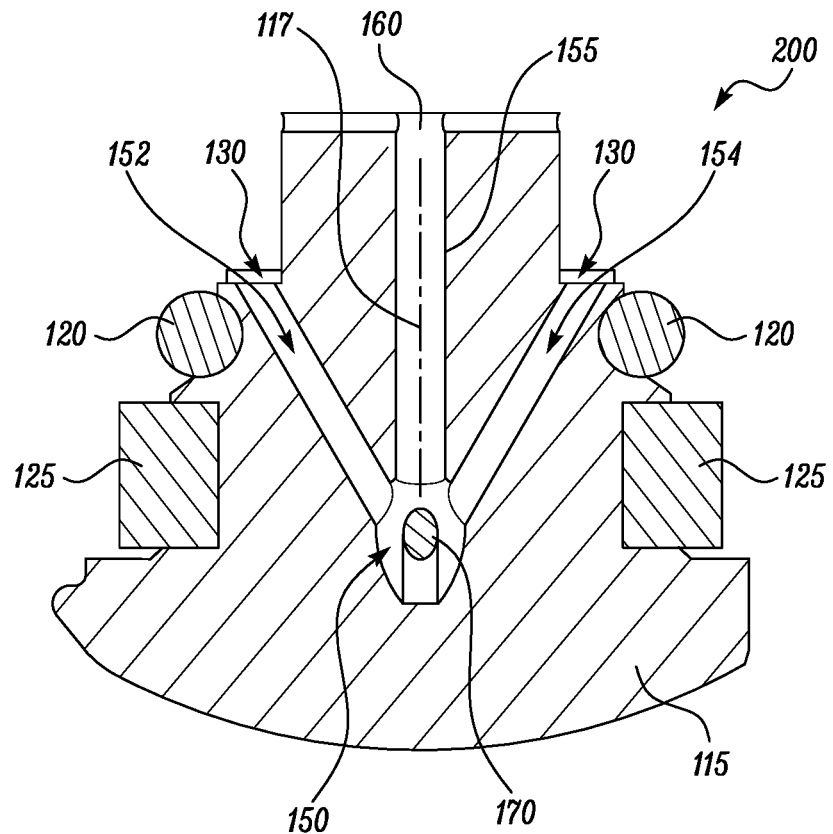
FIG. 4 is a cross-sectional view B-B of the isolated lubrication system of FIG. 3 having additional conduits, in accordance with the first embodiment of the present disclosure.
Figure 5:
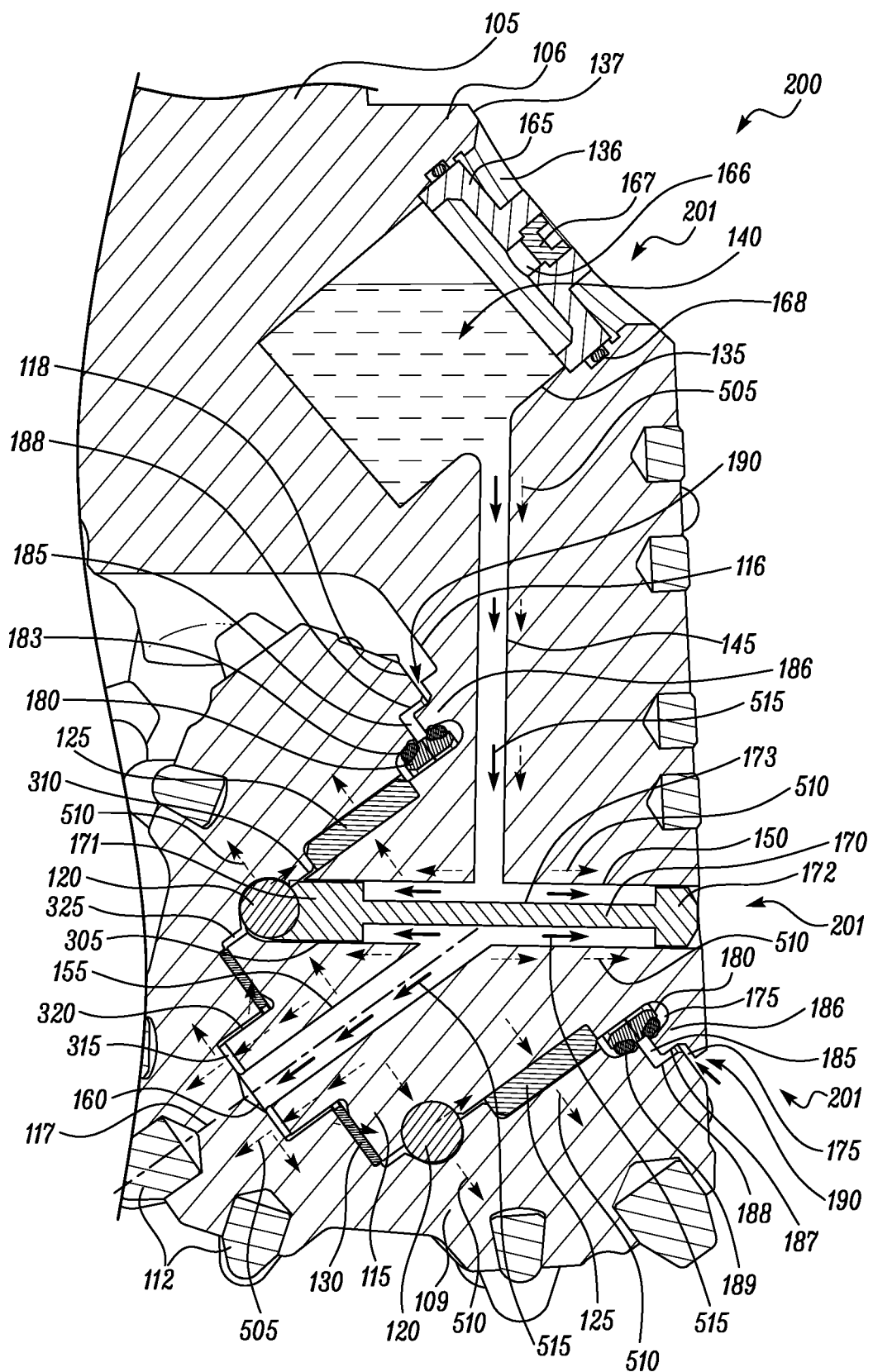
FIG. 5 is an exemplary illustration of a flow of a fluid lubricant in the isolated lubrication system of FIGS. 1-3, in accordance with the first embodiment of the present disclosure.

The isolated lubrication system 200 may include a first conduit 145 in the first cutting arm 106 that is in direct communication with the reservoir 135 such that the fluid lubricant 140 from the reservoir 135 occupies the first conduit 145 by means of a gravitational force 505 (see FIG. 5). The isolated lubrication system 200 may also include a second conduit 150 in the first cutting arm 106 that may be in direct communication with the first conduit 145 such that the fluid lubricant 140 from the first conduit 145 occupies the second conduit 150. The fluid lubricant 140 in the second conduit 150 may lubricate the ball bearing 120 and/or the roller bearing 125 as a result of the vacuum created in the isolated lubrication system 200 and also by means of a centrifugal force 510 (see FIG. 5) acting on the fluid lubricant 140 during operation. The rotation of the roller cone bit 100 around the central axis 101 may in turn result in the rotation of the first rotary cutter 109 around the axis 117 of the first rotary cutter 109. The rotation of the roller cone bit 100 and the first rotary cutter 109 may result in the centrifugal force 510 acting on the fluid lubricant 140 in the second conduit 150 as shown in FIG. 5. The fluid lubricant 140 in the second conduit 150 may lubricate the ball bearing 120 and/or the roller bearing 125 through annular spaces (305, 310) (see FIG. 3) formed between the journal 115 and the first rotary cutter 109. In some embodiments, the second conduit 150 may be a through-hole provided across the first cutting arm 106 such that bearing balls in the ball bearing 120 may be introduced in the drill bit via the second conduit 150 and a pin 170 may be inserted in the second conduit 150 to hold the bearings balls of the ball bearing 120 in position. In some embodiments, the isolated lubrication system 200 may include additional conduits (152, 154) (see FIG. 4) that may be in direct communication with the second conduit 150 and with the ball bearing 120 in order to lubricate the thrust bearing 130, the ball bearing 120 and/or the roller bearing 125. In addition, the isolated lubrication system 200 may also include a third conduit 155 in the first cutting arm 106 that is in direct communication with the second conduit 150 and extends to an outlet 160 provided in the journal 115 of the first cutting arm 106. The fluid lubricant 140 from the second conduit 150 may occupy the third conduit 155 by means of the gravitational force 505 and/or the centrifugal force 510 (see FIG. 5) and exit from the outlet 160. The fluid lubricant 140 exiting from the outlet 160 may lubricate the thrust bearing 130, the ball bearing 120, and/or the roller bearing 125 as a result of the vacuum created and also by means of the centrifugal force 510 (see FIG. 5) acting on the fluid lubricant 140 during rotation of the roller cone bit 100 and the first rotary cutter 109. The fluid lubricant 140 exiting from the outlet 160 may flow through annular spaces (315, 320, 325, 310) (see FIG. 3) formed between the journal 115 and the first rotary cutter 109 and lubricate the thrust bearing 130, the ball bearing 120, and/or the roller bearing 125 respectively. The conduits (145, 150, 155) may be cylindrical in shape and may be of same or different diameters. The second conduit 150 and the third conduit 155 may be in indirect communication with the reservoir 135 via the first conduit 145. Similarly, the third conduit 155 may be in indirect communication with the reservoir 135 and the first conduit 145 via the second conduit 150.

Figure 3:
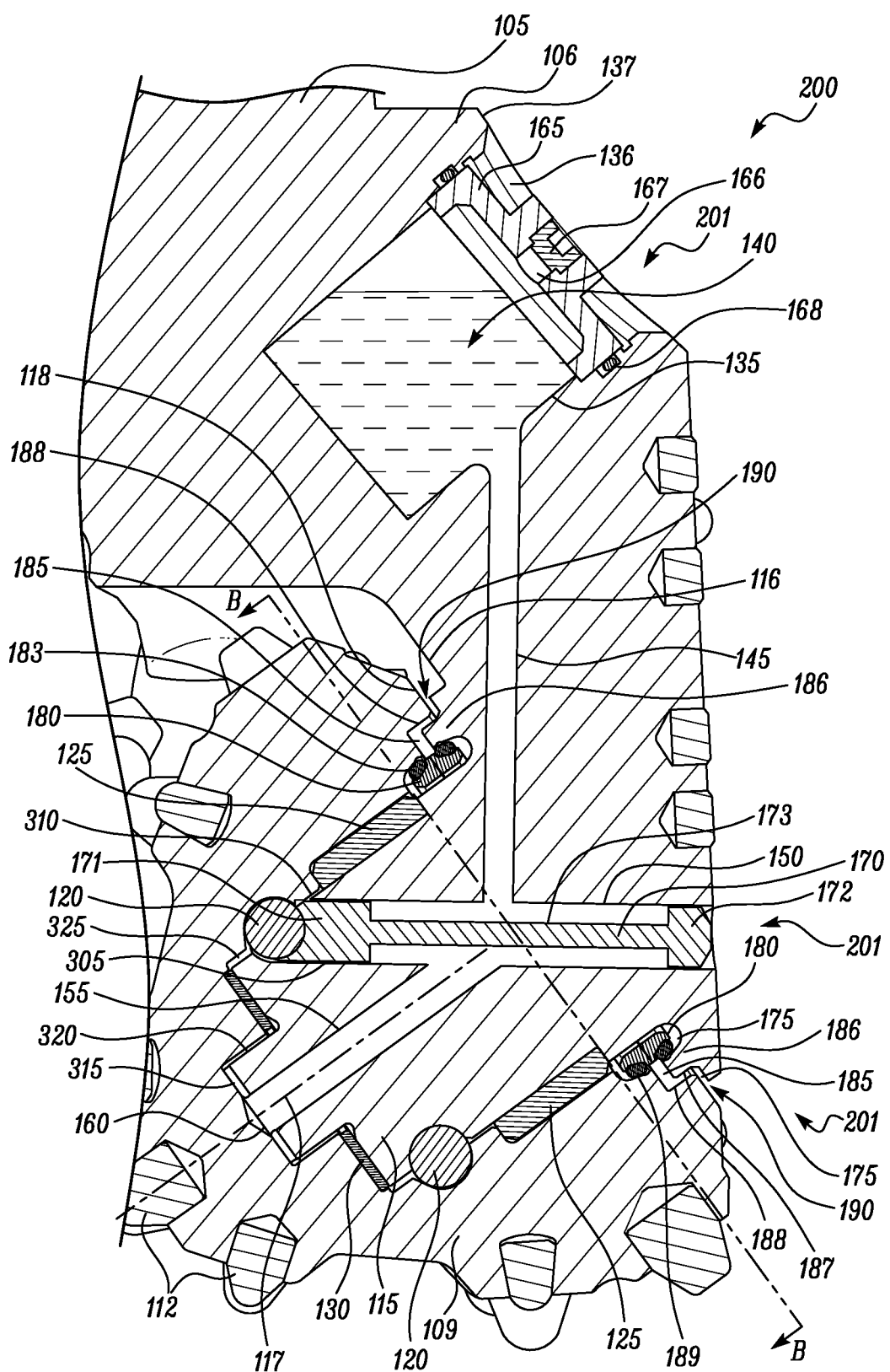
FIG. 3 is an exemplary illustration of an enlarged view of the isolated lubrication system of FIG. 2, in accordance with the first embodiment of the present disclosure.
Figure 6:
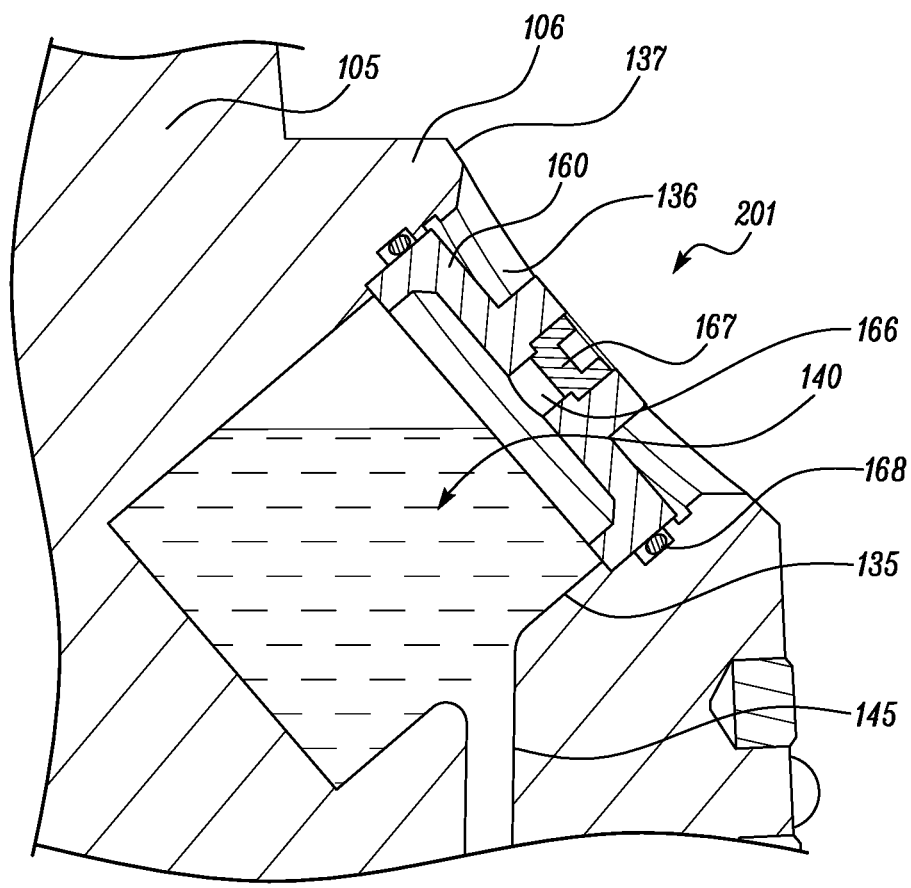
FIG. 6 is an exemplary illustration of an enlarged view of a sealing cap in the isolated lubrication system of FIGS. 2-3, in accordance with the first embodiment of the present disclosure.

Referring to FIG. 3, the isolated lubrication system 200 also includes a sealing system 201 to prevent leakage of the fluid lubricant 140 outside the body 105 of the roller cone bit 100. The sealing system 201 also isolates the fluid lubricant 140 from communication outside the body 105. The sealing system 201 includes a sealing cap 165 (also shown in FIG. 6) that seals the reservoir opening 136 and thereby, isolates the reservoir 135 from communication outside the body 105. The sealing cap 165 includes an orifice 166 and a retractable component 167 provided in the orifice 166. The retractable component 167 may be retracted and removed from the orifice 166 to facilitate suction of air from the reservoir 135 and/or to supply the fluid lubricant 140 into the reservoir 135 via the orifice 166. Examples of the retractable component 167 include, but are not limited to, a plug, a cap, a screw, or a nut and bolt assembly. A reservoir seal 168, for example, an O-ring seal, may also be provided around the sealing cap 165, to prevent seepage of the fluid lubricant 140 outside the reservoir 135 and to isolate the fluid lubricant 140 in the reservoir 135 from communication outside the body 105.

Alternate embodiments to facilitate the suction of air from the reservoir 135 may also be contemplated. For example, with reference to FIG. 8, a suction conduit 805 may be provided between the inlet 102 of the body 105 and the reservoir 135 to facilitate suction of air from the reservoir 135. As a result, the suction of air from the suction conduit 805 and the supply of the fluid lubricant 140 into the reservoir 135 via the orifice 166 in the sealing cap 165 may be carried out independently. A plug 810 with a suction seal 815 may be provided in the suction conduit 805 after the suction of air in order to isolate the reservoir 135 from communication outside the body 105. Alternatively, the suction conduit 805 may facilitate the supply of the fluid lubricant 140 into the reservoir 135 and the orifice 166 in the sealing cap 165 may facilitate the suction of air from the reservoir 135.

Referring back to FIG. 3, the sealing system 201 also includes the pin 170 inserted in the second conduit 150 to retain the ball bearing 120 in position and the fluid lubricant 140 in the second conduit 150. A first end 171 of the pin 170 may retain the ball bearing 120 in position and a second end 172 of the pin 170 may facilitate the isolation of the fluid lubricant 140 from communication outside the body 105. The second end 172 of the pin 170 may be welded in position in the second conduit 150 after the insertion in order to facilitate the isolation of the fluid lubricant 140. The pin 170 may be a metal pin having an annular groove 173 provided between the first end 171 and the second end 172 of the pin 170. The annular groove 173 may in turn facilitate the retention of the fluid lubricant 140 in the second conduit 150. The fluid lubricant 140 in the second conduit 150 may pass through an annular space 305 around a periphery of the first end 171 of the pin 170 in the second conduit 150 and lubricate the thrust bearing 130, the ball bearing 120, and/or the roller bearing 125. The lubrication may be facilitated as a result of the vacuum created in the isolated lubrication system 200 and also by means of the centrifugal force 510 (see FIG. 5) acting on the fluid lubricant 140 during rotation of the roller cone bit 100 and the first rotary cutter 109.

The first rotary cutter 109 may be mounted on the journal 115 such that a clearance 175 may be defined between the first rotary cutter 109 and a base surface 116 of the first cutting arm 106 from which the journal 115 extends. The sealing system 201 may also include a journal seal 180 (also shown in FIG. 7) provided between the journal 115 and the first rotary cutter 109 in the clearance 175.

Figure 7:
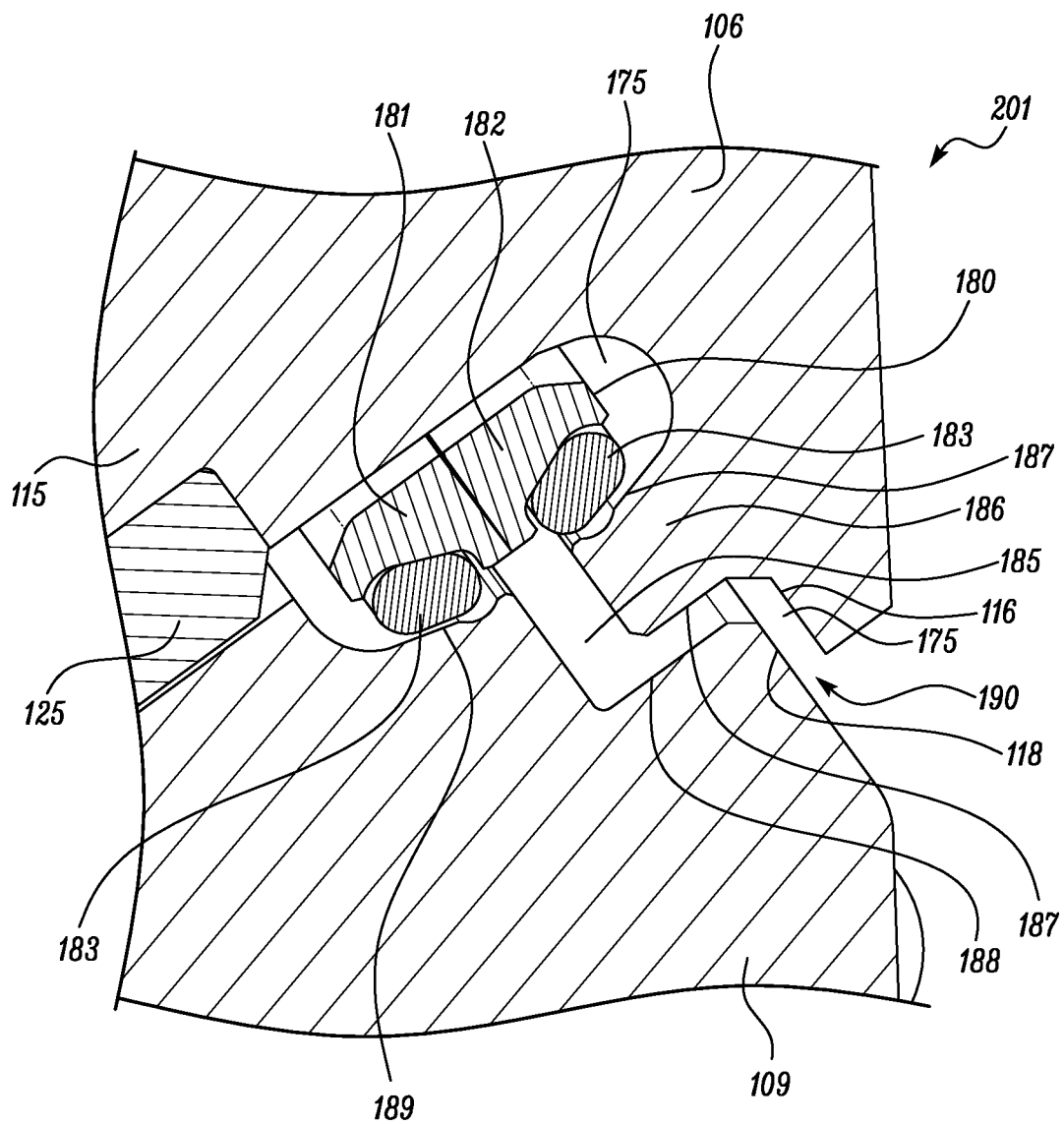
FIG. 7 is an exemplary illustration of an enlarged view of a seal and a stepped passageway in the isolated lubrication system of FIGS. 2-3, in accordance with the first embodiment of the present disclosure.

Referring to FIG. 7, the journal seal 180 may be a Duo-Cone™ seal having two seal rings 181, 182 for example, metal seal rings, that may be arranged coaxially with the journal 115 and in face-to-face sealing contact with respect to each other. The two seal rings 181, 182 may be further supported by annular seals 183, herein referred to as "torics", respectively. The torics 183 may be flexible and made of elastic material. Further, the torics 183 may enable the first rotary cutter 109 and the first cutting arm 106 to support the two seal rings 181, 182 respectively. The seal ring 181 may be rotatable along with the first rotary cutter 109 and the seal ring 182 may be stationary supported by the first cutting arm 106. The rotation of the first rotary cutter 109 along the axis 117, during operation, may cause the torics 183 to perform a springing action that may push the two seal rings 181, 182 further into the face-to-face sealing contact. As a result, the journal seal 180 may be capable of preventing the leakage of the fluid lubricant 140 (as shown in FIG. 5) at varying speeds of the rotation of the first rotary cutter first 109. The journal seal 180 may also facilitate the isolation of the fluid lubricant 140 from communication outside the body 105. In addition, the journal seal 180 may also prevent seepage of debris and contamination of the fluid lubricant 140 in the isolated lubrication system 200 from outside the body 105 of the roller cone bit 100.

Additional examples of the journal seal 180 include, but are not limited to, an O-ring seal, a T-seal, an inverted duo-cone seal, a tri-cone seal, a floating seal, a face seal, a heavy-duty seal, a lifetime seal, a Chevron-ring stack seal, a bonded seal, a helical-spring seal, an S-seal, a step seal, a wedge seal, a spring energized seal, a toric seal, or any other mechanical face seal. In some embodiments, a bushing (not shown) may also be provided between the journal 115 and the first rotary cutter 109 in place of the journal seal 180.

Further, the sealing system 201 also includes a stepped passageway 185 or a labyrinth that extends from the journal seal 180 to an opening 190 provided between the first cutting arm 106 and the first rotary cutter 109 in the clearance 175. The stepped passageway 185 may be defined by a combination of a continuous lip 186 provided on the base surface 116 in the first cutting arm 106 and a continuous groove 188 provided on an end surface 118 in the first rotary cutter 109 in the clearance 175. The end surface 118 faces the base surface 116 of the cutting arm 106 in the clearance 175. The continuous lip 186 and the continuous groove 188 may also be annular in shape. The continuous lip 186 may be accommodated in the continuous groove 188 such that the stepped passageway 185 is defined in the clearance 175. The stepped passageway 185 may be "L", "S", or "Z" shaped or a combination of different shapes. The stepped passageway 185 may also include a portion of the clearance 175 defined between the base surface 116 and the end surface 118 at the opening 190. In some embodiments, two or more continuous lips and continuous grooves similar to the continuous lip 186 and the continuous groove 188 respectively may be provided between the first cutting arm 106 and the first rotary cutter 109 such that the two or more continuous lips and continuous grooves may collectively define the stepped passageway 185. The continuous lip 186 may be provided around the journal 115 on the base surface 116 of the cutting arm 106 from which the journal 115 extends. The continuous lip 186 may define side walls 187 that may be perpendicular to the base surface 116 of the first cutting arm 106. In some embodiments, the continuous lip 186 and the continuous groove 188 may be provided adjacent to the journal seal 180. An annular sealing groove 189 may also be provided adjacent to the continuous groove 188 in the first rotary cutter 109. The annular sealing groove 189 and at least one side wall 187 of the side walls 187 may support the two seal rings 181, 182 respectively via the torics 183. The torics 183 may be compressed against the annular sealing groove 189 and the side wall 187 of the continuous lip 186 respectively in order to seal the fluid lubricant 140 (as shown in FIG. 5) from communication outside the body 105.

In an alternate embodiment, the continuous lip 186 may be provided on the end surface 118 of the first rotary cutter 109 and the continuous groove 188 may be provided in the base surface 116 of the first cutting arm 106 in order to define the stepped passageway 185.

The stepped passageway 185 may impede a flow of debris of cut matter that may accumulate at the opening 190 during operation of the roller cone bit 100. As a result, the stepped passageway 185 may prevent the journal seal 180 from abrasion due to the debris and improve a lifespan of the journal seal 180. Consequently, the fluid lubricant 140 (as shown in FIG. 5) contained by the journal seal 180 may also be prevented from contamination due to the debris.

Figure 8:
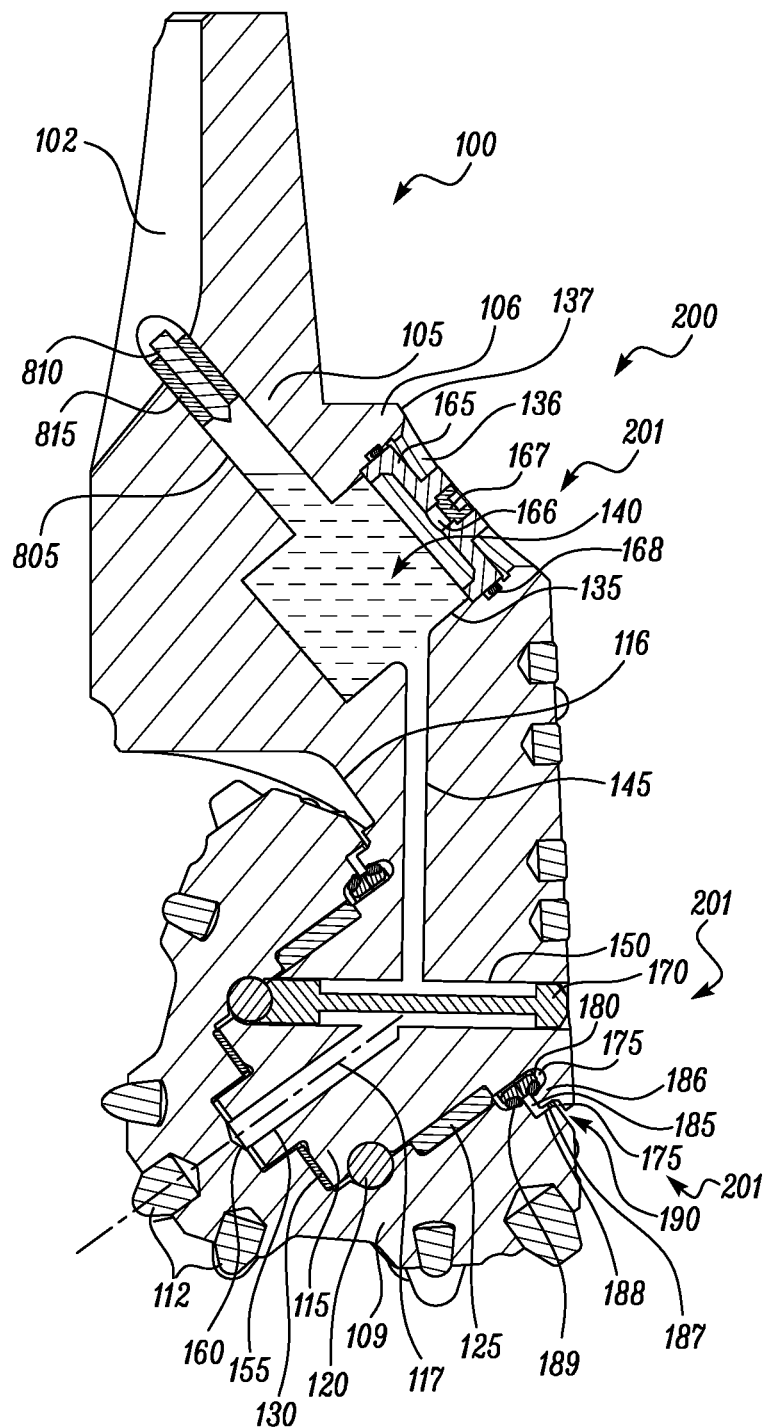
FIG. 8 is an exemplary illustration of the isolated lubrication system of FIGS. 2-3 provided with a suction conduit; in accordance with a second embodiment of the present disclosure.

In embodiments, for example, as shown in FIG. 8, of the isolated lubrication system 200, the sealing system 201 may also include the plug 810 with the suction seal 815 provided in the suction conduit 805 to isolate the reservoir 135 from the inlet 102 of the body 105.

Referring to FIGS. 1-2, in some embodiments, the body 105 of the roller cone bit 100 may include multiple cutting arms of different shapes and sizes not described in the present disclosure. Accordingly, the isolated lubrication system 200 described in the present disclosure may also be applicable to the body 105 of the roller cone bit 100 having multiple cutting arms and multiple rotary cutters mounted on the multiple cutting arms respectively. The multiple cutting arms and the multiple rotary cutters may be of different shapes and sizes. Further, multiple conduits having different shapes and placed in different positions in the body 105 may also be provided to facilitate lubrication between the multiple cutting arms and the multiple rotary cutters, including the multiple bearings therein respectively. Further, alternate embodiments (as shown in FIG. 9 and FIG. 11) of the shape, the size, and a position of the reservoir 135 in the body 105 may also be contemplated.

Figure 9:
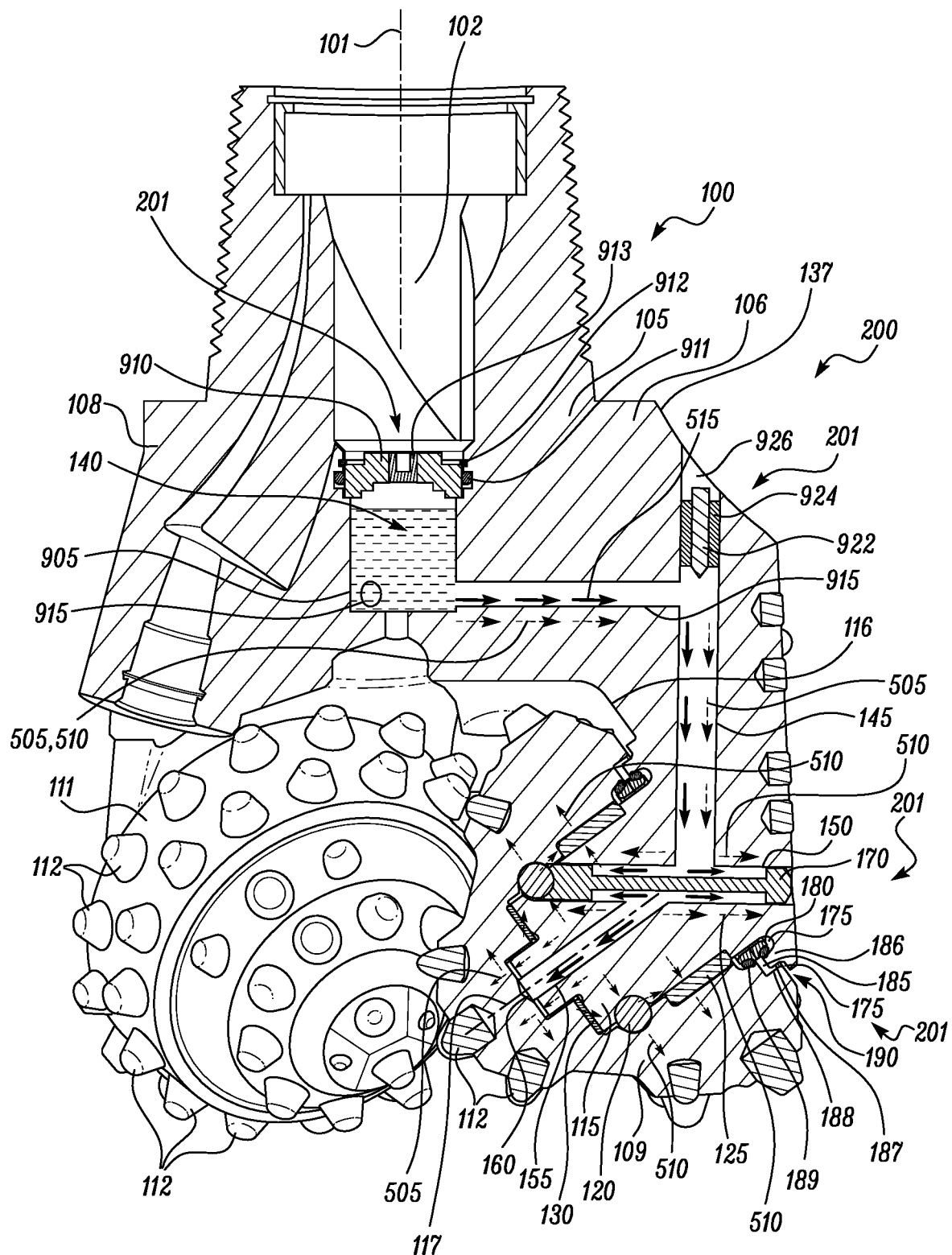
FIG. 9 is the cross-sectional view A-A of the rotary drill bit of FIG. 1 having the isolated lubrication system that is provided with a central reservoir, in accordance with a third embodiment of the present disclosure.

Referring to FIG. 9, an alternate embodiment of the isolated lubrication system 200 of FIGS. 1-2, having a central reservoir 905 provided in the body 105 in place of the reservoir 135 is disclosed. In an embodiment, the central reservoir 905 (also shown in FIG. 10) may be a cylindrical slot provided in the inlet 102. The central reservoir 905 may be provided with a sealing cap 910 and sealed from the direct communication with the inlet 102 by means of a seal 911, such as, for example, an O-ring seal and a seat ring 912. The sealing cap 910 may include a central retractable component 913. The central retractable component 913 may be retracted and removed to introduce the fluid lubricant 140 into the central reservoir 905. Connecting conduits 915 may be provided between the central reservoir 905 and the cutting arms (106, 107, 108) respectively. For purposes of clarity and understanding, the central reservoir 905 in direct communication with the first cutting arm 106 via the connecting conduit 915 will be described herein in detail. The central reservoir 905 in direct communication with the connecting conduits 915 to the cutting arms 107 and 108 will be omitted for brevity.

The first conduit 145 in the first cutting arm 106 may be in direct communication with the connecting conduit 915 and in indirect communication with the central reservoir 905. In an embodiment, the connecting conduit 915 may be perpendicular to the central reservoir 905. In another embodiment, the connecting conduit 915 may be inclined at an angle with respect to the central reservoir 905. The first conduit 145 may also extend to a cutting arm opening 926 provided on the peripheral surface 137 of the first cutting arm 106. The cutting arm opening 926 may facilitate the suction of air from the isolated lubrication system 200. The first conduit 145 may also be provided with a plug 922 and a conduit seal 924 in the cutting arm opening 926 to isolate the fluid lubricant 140 from communication outside the body 105 after the suction of air. In an alternate embodiment, the central retractable component 913 of the sealing cap 910 may be removed to facilitate the suction of the air from the central reservoir 905 and the fluid lubricant 140 may be introduced via the cutting arm opening 926 such that the central reservoir 905, the connecting conduit 915, and the conduits (145, 150, 155) are filled with the fluid lubricant 140. The plug 922 and the conduit seal 924 may then be provided in the cutting arm opening 926 to isolate the fluid lubricant 140 from communication outside the body 105.

Figure 11:
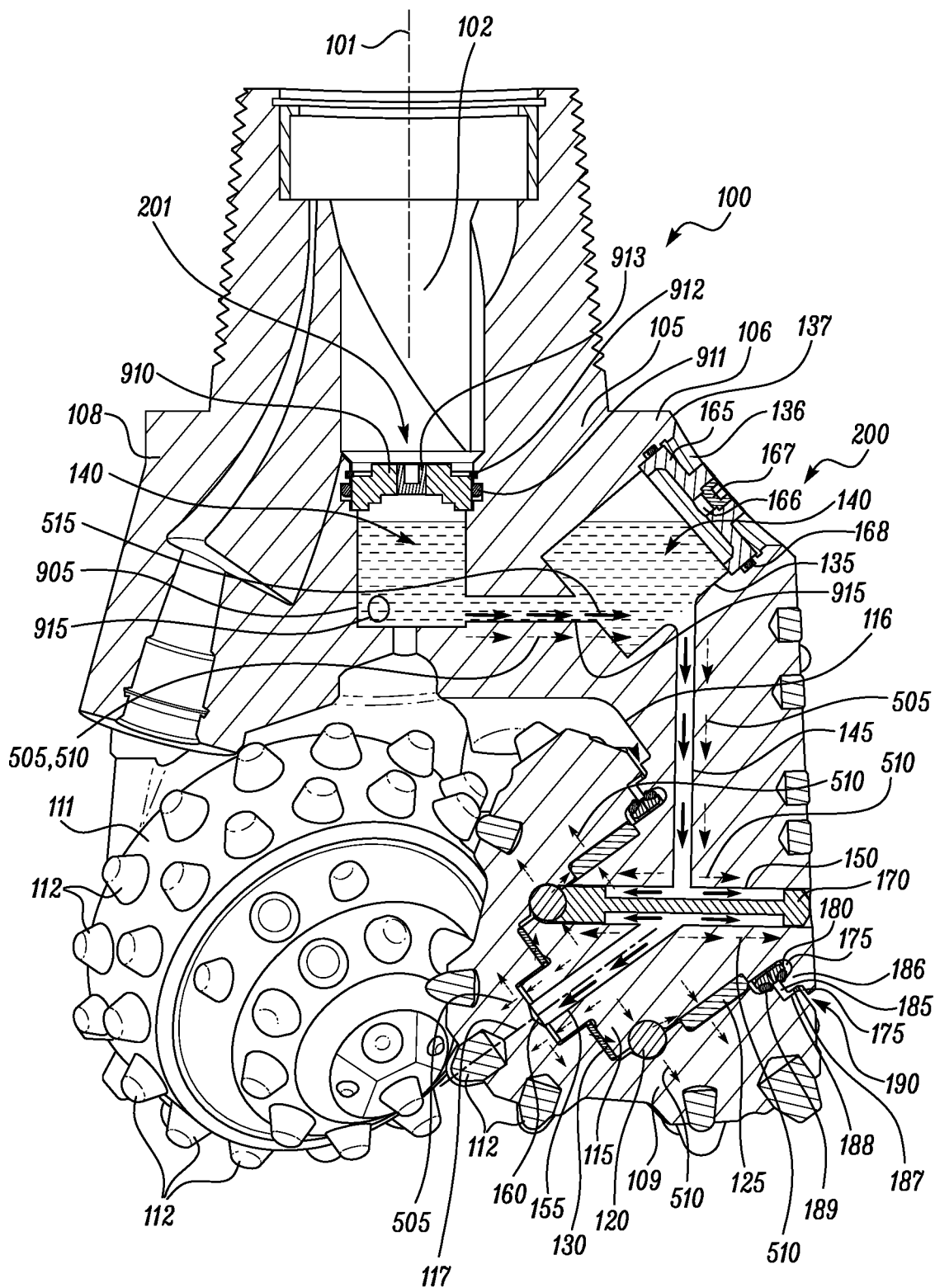
FIG. 11 is the cross-sectional view A-A of the rotary drill bit of FIG. 1 having a combination of the isolated lubrication system of FIG. 9 and FIGS. 2-3; in accordance with a fourth embodiment of the present disclosure.

Referring to FIG. 11, a combination of the isolated lubrication system 200 of FIG. 9 and FIGS. 2-3 is disclosed. The central reservoir 905 may be in communication with the reservoir 135 via the connecting conduit 915. The first conduit 145 in the first cutting arm 106 may be in indirect communication with the connecting conduit 915 via the reservoir 135 and hence, in indirect communication with the central reservoir 905. In one embodiment, the central retractable component 913 of the sealing cap 910 may be retracted and removed to facilitate the supply of the fluid lubricant 140 into the central reservoir 905, the connecting conduit 915, the reservoir 135, and the conduits (145, 150, 155). Further, the retractable component 167 in the sealing cap 165 may be retracted and removed to facilitate the suction of the air from the reservoir 135 and the central reservoir 905 via the orifice 166. Alternatively, the central retractable component 913 of the sealing cap 910 may be removed to facilitate the suction of the air from the central reservoir 905 and the reservoir 135. The retractable component 167 in the sealing cap 165 may then be retracted and removed to facilitate the supply of the fluid lubricant 140 into the reservoir 135, the conduits (145, 150, 155), the connecting conduit 915, and the central reservoir 905. The vacuum created as a result of the suction of the air and the gravitational force 505 may facilitate the lubrication of the bearings (120, 125) and the thrust bearing (130) when the central reservoir 905 and the reservoir 135 are filled with the fluid lubricant 140.

INDUSTRIAL APPLICABILITY

Referring to FIG. 2 and FIG. 5, the body 105 of the roller cone bit 100 may be adapted to cut the rock matter and remove debris from a bore hole (not shown). The roller cone bit 100 may be connected to a drilling machine (not shown) via a feed unit (not shown). The feed unit may be connected to a power source (not shown) including a rotor (not shown) that provides the necessary rotation to the roller cone bit 100. The feed unit may include a drill pipe having a drill string that may supply compressed air or fluids to flush the cut matter from the bore hole. Further, the feed unit may provide necessary feed force to facilitate the cutting of rock matter in the bore hole.

Prior to operation of the roller cone bit 100, the isolated lubrication system 200 in the cutting arms (106, 107, 108) respectively may need to be primed. The air from the reservoir 135 may need to be removed in order to create a vacuum and introduce the fluid lubricant 140 in the reservoir 135. In one embodiment, the retractable component 167 of the sealing cap 165 may be retracted and detached from the sealing cap 165 in order to facilitate suction of air. The fluid lubricant 140 may then be introduced into the reservoir 135. The retractable component 167 may then be affixed to the sealing cap 165 to isolate the fluid lubricant 140 in the reservoir 135 from communication outside the body 105 of the roller cone bit 100. In another embodiment, the air from the reservoir 135 may be removed via the suction conduit 805 (see FIG. 8) and sealed by means of the plug 810 and the suction seal 815 provided in the suction conduit 805. The fluid lubricant 140 may then be introduced into the reservoir 135 by detaching the retractable component 167 in the sealing cap 165 and re-attaching the retractable component 167 to isolate the fluid lubricant 140. The fluid lubricant 140 may be introduced into the reservoir 135 such that the fluid lubricant 140 occupies the first conduit 145, the second conduit 150, and the third conduit 155. The fluid lubricant 140 may also occupy the additional conduits 152 and 154 in communication with the second conduit 150. In an embodiment, the fluid lubricant 140 may occupy 80-85 percent of the volume of the reservoir 135 such that the fluid lubricant 140 is contained in the reservoir 135 in an event of a thermal expansion of the fluid lubricant 140 during operation of the roller cone bit 100. Further, in an embodiment, the fluid lubricant 140 may have a viscosity between 80 centistokes and 200 centistokes at an operating temperature of 40 degree Celsius. The flow 515 of the fluid lubricant 140 in the isolated lubrication system 200 may be due the gravitational force 505 and the centrifugal force 510 acting on the fluid lubricant 140 during operation of the roller cone bit 100. The isolated lubrication system 200 may require no additional components or systems to facilitate the flow 515 of the fluid lubricant 140 in the isolated lubrication system 200.

During operation of the roller cone bit 100, the power source may facilitate the rotation of the roller cone bit 100 around the central axis 101 via the feed unit. The rotation of the roller cone bit 100 may in turn result in the rotation of the rotary cutters (109, 110, 111) mounted on the journals 115 of the cutting arms (106, 107, 108) respectively. The rotary cutters (109, 110, 111) may rotate around respective axes and the journals 115 in a direction opposite to the direction of rotation of the roller cone bit 100. For example, the roller cone bit 100 may rotate in a clockwise direction and the rotary cutters (109, 110, 111) may rotate in an anti-clockwise direction.

For purposes of clarity and understanding, the flow 515 of the fluid lubricant 140 in the isolated lubrication system 200 of the first cutting arm 106 will be described herein in detail. The flow 515 of the fluid lubricant 140 in the isolated lubrication system 200 of the second cutting arm 107 and the third cutting arm 108 will be omitted for brevity.

The fluid lubricant 140 occupies the first conduit 145 by means of the gravitational force 505. The rotation of the roller cone bit 100 and the first rotary cutter 109 also results in the centrifugal force 510 that acts on the fluid lubricant 140. The centrifugal force 510 acting on the fluid lubricant 140 enables the fluid lubricant 140 to pass through an annular space 305 around the first end 171 of the pin 170 in the second conduit 150 and thereby, results in the lubrication of the ball bearing 120. The fluid lubricant 140 may also seep through an annular space 310 between the ball bearing 120 and the roller bearing 125 and lubricate the roller bearing 125. Further, the fluid lubricant 140 may then seep through an annular space 325 between the ball bearing 120 and the thrust bearing 130 and lubricate the thrust bearing 130. Further, the fluid lubricant 140 occupies the third conduit 155 by means of the gravitational force 505. The gravitational force 505 and/or the centrifugal force 510 acting on the fluid lubricant 140 due to rotation of the roller cone bit 100 and the first rotary cutter 109 enables the fluid lubricant 140 to exit the outlet 160 of the third conduit 155. The fluid lubricant 140 from outlet 160 may then pass through annular spaces 315, 320, and 325 and thereby, lubricate the thrust bearing 130 and the ball bearing 120 respectively. The fluid lubricant 140 from the annular space 325 may also seep around ball bearing 120 and into the annular space 310 to lubricate the roller bearing 125. The journal seal 180 may prevent further seepage of the fluid lubricant 140 around the roller bearing 125.

The rotation of the first rotary cutter 109 also enables the inserts 112 provided on the first rotary cutter 109 to cut through the rock matter in the bore hole (not shown). The debris of cut matter may accumulate around the first rotary cutter 109 and may enter the clearance 175 via the opening 190. The stepped passageway 185 provided in the clearance 175 may impede a flow of the debris from the opening 190 to the journal seal 180. The stepped passageway 185 may thereby reduce the abrasion of the journal seal 18 and improve a lifespan of the journal seal 180. As a result, the journal seal 180 may also prevent the debris from contaminating the fluid lubricant 140 around the bearings (120, 125) and thereby, also improving a lifespan of the bearings (120, 125) being lubricated.

Figure 10:
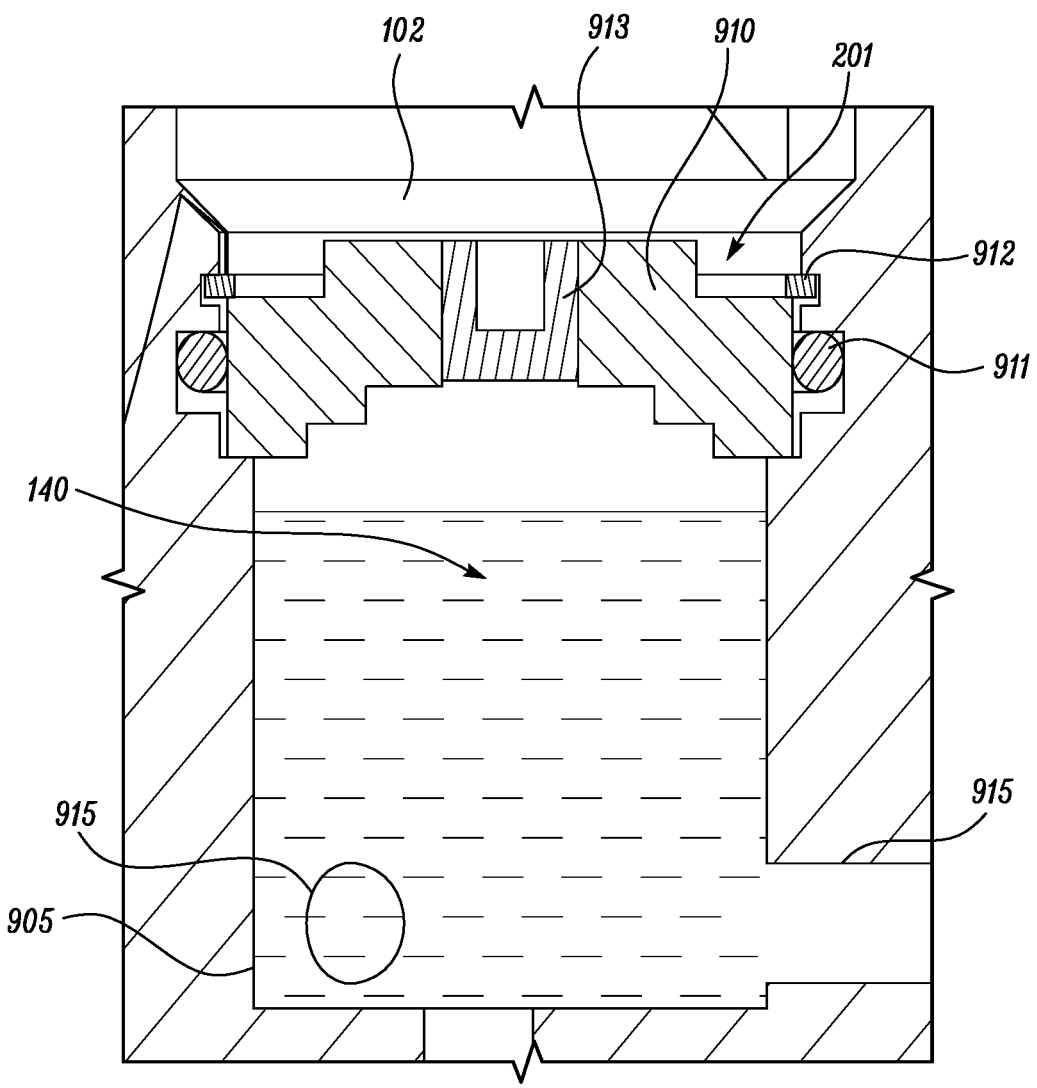
FIG. 10 is an exemplary illustration of an enlarged view of the central reservoir of FIG. 9, in accordance with the third embodiment of the present disclosure.

Referring to FIGS. 9-10, prior to operation of the roller cone bit 100, the air from the isolated lubrication system 200 may be removed by means of the cutting arm opening 926 and the cutting arm opening 926 may then be sealed by means of the plug 922 and the conduit seal 924. The central retractable component 913 in the sealing cap 910 of the central reservoir 905 may then be retracted and removed in order to introduce the fluid lubricant 140 into the central reservoir 905 until the connecting conduit 915, and the conduits (145, 150, 155) are occupied with the fluid lubricant 140. For instances when the connecting conduit 915 is perpendicular to the central reservoir 905, the vacuum created facilitates the flow 515 of the fluid lubricant 140 in the connecting conduit 915. Further, for instances when the connecting conduit 915 is inclined at an angle with respect to the central reservoir 905, the gravitational force 505 acting on the fluid lubricant 140, in addition to the vacuum created, may facilitate the flow 515 of the fluid lubricant 140 in the connecting conduit 915. The central retractable component 913 may then be affixed to the sealing cap 910 to isolate the fluid lubricant 140 in the central reservoir 905 from communication with the inlet 102 of the roller cone bit 100. The vacuum created as a result of the removal of the air from the isolated lubrication system 200 and the gravitational force 505 facilitate in the lubrication of the thrust bearing 130, the ball bearing 120, and the rolling element bearing 125 as the fluid lubricant 140 is filled into the central reservoir 905.

During operation, the fluid lubricant 140 from the central reservoir 905 may flow 515 through the connecting conduit 915 by means of the centrifugal force 510. The fluid lubricant 140 may then flow 515 in the conduits (145, 150, 155) by means of the gravitational force 505 and/or the centrifugal force 510 and provide lubrication between the journal 115 and the first rotary cutter 109, including the bearings (120, 125).

Referring to FIG. 11, prior to operation of the roller cone bit 100, the air from the isolated lubrication system 200 may be removed via the orifice 166 of the sealing cap 165 by removing the retractable component 167. The retractable component 167 may then be affixed to the sealing cap 165 such that a vacuum is created in the isolated lubrication system 200. The central retractable component 913 in the sealing cap 910 of the central reservoir 905 may then be retracted and removed in order to introduce the fluid lubricant 140 into the central reservoir 905 until the connecting conduit 915, the reservoir 135, and the conduits (145, 150, 155) are occupied with the fluid lubricant 140 by means of the vacuum created and the gravitational force 505. For instances when the connecting conduit 915 is perpendicular to the central reservoir 905, the vacuum created facilitates the flow 515 of the fluid lubricant 140 in the connecting conduit 915. Further, for instances when the connecting conduit 915 is inclined at an angle with respect to the central reservoir 905, the gravitational force 505 acting on the fluid lubricant 140, in addition to the vacuum created, may facilitate the flow 515 of the fluid lubricant 140 in the connecting conduit 915. The central retractable component 913 may then be affixed to the sealing cap 910 to isolate the fluid lubricant 140 in the central reservoir 905 from communication with the inlet 102 of the roller cone bit 100. The vacuum created as a result of the removal of the air from the isolated lubrication system 200 facilitates in the lubrication of the thrust bearing 130, the ball bearing 120, and the rolling element bearing 125 as the fluid lubricant 140 is filled into the reservoir 135.

During operation, the fluid lubricant 140 from the central reservoir 905 may flow 515 through the connecting conduit 915 to the reservoir 135 by means of the gravitational force 505 and/or centrifugal force 510. The fluid lubricant 140 may then flow 515 in the conduits (145, 150, 155) from the reservoir 135 by means of the gravitational force 505 and/or the centrifugal force 510 and provide lubrication between the journal 115 and the first rotary cutter 109, including thrust bearing 130 and the bearings (120, 125).

As is apparent, the isolated lubrication system 200 (as shown in FIG. 2, FIG. 9, and FIG. 11) may improve a lifespan and performance of the first rotary cutter 109, the bearings (120, 125), and hence, the roller cone bit 100.

It will also be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A rotary drill bit, comprising:
   a body having at least three cutting arms, each cutting arm having a journal extending therefrom and a rotary cutter mounted on the respective journal by means of a plurality of bearings such that a clearance is defined between the rotary cutter and a base surface of the cutting arm from which the journal extends, and a body inlet; and
   an isolated lubrication system including:
   a body reservoir in the body to contain a fluid lubricant, the fluid lubricant being isolated from communication outside the body;
   an arm reservoir in each of the cutting arms;
   a plurality of conduits in the body having direct or indirect communication with the reservoirs and with respect to each other such that the plurality of conduits facilitate lubrication between the journals and the rotary cutters and to the bearings by means of at least one of a gravitational force and a centrifugal force acting on the fluid lubricant, and
   a suction conduit extending from the body inlet in the body to the body reservoir and creating a vacuum in the body reservoir, a suction seal being provided in the suction conduit isolating the body reservoir after the vacuum is created;
   a sealing system including:
   a sealing cap provided to the body reservoir to isolate the body reservoir from communication outside the body in combination with the body suction seal;
   a seal provided between the journal and the rotary cutter in the clearance,
   a stepped passageway extending from the seal to an opening in the clearance and having an "S" or "Z" shape, wherein the stepped passageway is defined by a combination of a continuous lip provided in each cutting arm and a continuous groove provided in the rotary cutter in the clearance, the continuous lip being accommodated in the continuous groove in the clearance; and
   each cutting arm defines an arm sealing system including an arm sealing cap and an arm suction seal provided in each arm sealing cap provided to each arm reservoir and originating from the respective arm reservoir in each cutting arm to the exterior of the body to create the vacuum in each reservoir and to isolate the respective arm reservoir in each cutting arm after the vacuum is created from communication outside the body in combination with the body suction seal.

2. The rotary drill bit of claim 1, wherein the cutting arm includes the arm reservoir, the sealing cap provided to the arm reservoir, and the plurality of conduits.

3. The rotary drill bit of claim 1, wherein the plurality of conduits includes:
   a first conduit in the body that is in communication with the body reservoir such that the fluid lubricant from the reservoir occupies the first conduit by means of a gravitational force,
   a second conduit in the body that is in communication with the first conduit such that the fluid lubricant from the first conduit occupies the second conduit and lubricates at least one bearing of the plurality of bearings, and
   a third conduit in the body that is in communication with the second conduit and extends to an outlet provided in the journal such that the fluid lubricant from the second conduit occupies the third conduit, exits from the outlet, and lubricates the at least one bearing.

4. The rotary drill bit of claim 1, wherein the body includes three cutting arms of the cutting arm, each cutting arm of the three cutting arms including the journal extending therefrom, the arm reservoir, the sealing cap provided to the arm reservoir, and the plurality of conduits independently.

5. The rotary drill bit of claim 1, wherein:
   the rotary drill bit further comprising the body reservoir in communication with the three arm reservoirs and being shared by the three cutting arms, wherein each cutting arm includes the plurality of conduits in direct or indirect communication with the body reservoir independently.

6. The rotary drill bit of claim 1, wherein the plurality of bearings includes a thrust bearing, a ball bearing, and a rolling element bearing.

7. The rotary drill bit of claim 1, wherein a rotation of the rotary drill bit and a rotation of the rotary cutter around the journal results in the centrifugal force that directs the fluid lubricant from the plurality of conduits to the at least one bearing.

8. An isolated lubrication system for a rotary drill bit, comprising:
   a body having at least three cutting arms, each cutting arm having a journal extending therefrom and a rotary cutter mounted on the respective journal by means of a plurality of bearings such that a clearance is defined between the rotary cutter and a base surface of the cutting arm from which the journal extends, and a body inlet, wherein the body defines:
   a body reservoir in the body to contain a fluid lubricant, the fluid lubricant being isolated from communication outside the body;
   an arm reservoir in each of the cutting arms;

a first conduit in the body that is in communication with the body reservoir such that the fluid lubricant from the body reservoir occupies the first conduit by means of a gravitational force, a second conduit in the body that is in communication with the first conduit such that the fluid lubricant from the first conduit occupies the second conduit and lubricates at least one bearing of the plurality of bearings, and a third conduit in the body that is in communication with the second conduit and extends to an outlet provided in the journal such that the fluid lubricant from the second conduit occupies the third conduit, exits from the outlet, and lubricates the at least one bearing; and a suction conduit extending from the body inlet in the body to the body reservoir and creating a vacuum in the body reservoir, a suction seal being provided in the suction conduit isolating the body reservoir after the vacuum is created;

a sealing system including:

a sealing cap provided to the body reservoir in the body to isolate the body reservoir from communication outside the body in combination with the body suction seal;

a pin inserted in the second conduit to retain the at least one bearing in position and the fluid lubricant in the second conduit, a seal provided between the journal and the rotary cutter in the clearance, a stepped passageway extending from the seal to an opening provided between the cutting arm and the rotary cutter in the clearance, wherein the stepped passageway has an "S" or "Z" shape and is defined by a combination of a continuous lip provided in each cutting arm and a continuous groove provided in the rotary cutter in the clearance, the continuous lip being accommodated in the continuous groove in the clearance;

each cutting arm defines an arm sealing system including an arm sealing cap and an arm suction seal provided in each arm sealing cap provided to each arm reservoir and originating from the respective arm reservoir in each cutting arm to the exterior of the body to create the vacuum in each reservoir and to isolate the respective arm reservoir in each cutting arm after the vacuum is created from communication outside the body in combination with the body suction seal.

9. The isolated lubrication system of claim 8, wherein the fluid lubricant flows through an annular space around the pin inserted in the second conduit and lubricates the at least one bearing of the plurality of bearings.

10. The isolated lubrication system of claim 8, wherein the body defines one or more additional conduits in communication with the second conduit such that the fluid lubricant from the second conduit flows through the one or more additional conduits and lubricates the at least one bearing of the plurality of bearings.

11. The isolated lubrication system of claim 8, wherein the seal includes a first seal ring, a second seal ring, and one or more annular seals, the first seal ring and the second seal ring being coaxial with the journal and supported by the annular seals.

12. The isolated lubrication system of claim 11, wherein the first seal ring is rotatable with the rotary cutter, the second seal ring is stationary supported by the cutting arm, and a rotation of the rotary cutter performs a springing action pushing the first seal ring and the second seal ring further into sealing contact.

13. The isolated lubrication system of claim 8, wherein the sealing cap and arm sealing caps each includes a retractable component that is retractable and detachable from the sealing cap and arm sealing caps in order to facilitate suction of air from the body reservoir and the arm reservoirs and supply of the fluid lubricant into the body reservoir and the arm reservoirs, and is attachable to the sealing cap to isolate the reservoir from communication outside the body.

14. The isolated lubrication system of claim 8, wherein a centrifugal force resulting from a rotation of the rotary drill bit and a rotation of the rotary cutter around the journal directs the fluid lubricant from the outlet in the journal to the at least one bearing via an annular space between the journal and the rotary cutter.

15. The isolated lubrication system of claim 8, wherein the fluid lubricant occupies 80 percent to 85 percent of a volume of the isolated lubricant reservoir.

16. A drilling machine, comprising:

a power source;

a feed unit in communication with the power source; and a drill bit connected to the feed unit; wherein the drill bit defines:

a body having at least three cutting arms, each cutting arm having a journal extending therefrom and a rotary cutter mounted on the respective journal by means of a plurality of bearings such that a clearance is defined between the rotary cutter and a base surface of the cutting arm from which the journal extends, and a body inlet; and an isolated lubrication system including:

a body reservoir in the body to contain a fluid lubricant, the fluid lubricant being isolated from communication outside the body;

an arm reservoir in each of the cutting arms;

a plurality of conduits in the body having direct or indirect communication with the reservoirs and with respect to each other such that the plurality of conduits facilitate lubrication between the journals and the rotary cutters and to the bearings by means of at least one of a gravitational force and a centrifugal force acting on the fluid lubricant, and a suction conduit extending from the body inlet in the body to the body reservoir and creating a vacuum in the body reservoir, a suction seal being provided in the suction conduit isolating the body reservoir after the vacuum is created;

a sealing system including:

a sealing cap provided to the body reservoir to isolate the body reservoir from communication outside the body in combination with the body suction seal;

a seal provided between the journal and the rotary cutter in the clearance, a stepped passageway extending from the seal to an opening provided in the clearance, wherein the stepped passageway has an "S" or "Z" shape and is defined by a combination of a continuous lip provided in each cutting arm and a continuous groove provided in the rotary cutter in the clearance, the continuous lip being accommodated in the continuous groove in the clearance;

each cutting arm defines an arm sealing system including an arm sealing cap and an arm suction seal provided in each arm sealing cap provided to each arm reservoir and originating from the respective arm reservoir in each cutting arm to the exterior of the body to create the vacuum in each reservoir and to isolate the respective arm reservoir in each cutting arm after the vacuum is created from communication outside the body in combination with the body suction seal.

17. The drilling machine of claim 16, wherein the drill bit is a roller cone drill bit and the rotary cutter is a roller cone having spaced inserts to cut rock matter, the rotary cutter being capable of rotating around an axis of the roller cone and the journal.

18. The drilling machine of claim 16, wherein the plurality of conduits includes:

a first conduit in the body that is in communication with the body reservoir such that the fluid lubricant from the body reservoir occupies the first conduit by means of a gravitational force, a second conduit in the body that is in communication with the first conduit such that the fluid lubricant from the first conduit occupies the second conduit and lubricates at least one bearing of the plurality of bearings, and a third conduit in the body that is in communication with the second conduit and extends to an outlet provided in the journal such that the fluid lubricant from the second conduit occupies the third conduit, exits from the outlet, and lubricates the at least one bearing.

19. The drilling machine of claim 16, wherein each cutting arm defines an arm suction conduit originating from the arm reservoir in each cutting arm to the body inlet, the inlet being shared by the three cutting arms to create a vacuum in each reservoir and a suction seal provided in each arm suction conduit to isolate each arm reservoir after the vacuum is created.

* * * * *